United States Patent [19]

Alston

[11] Patent Number: 4,641,184
[45] Date of Patent: Feb. 3, 1987

[54] ELECTRONIC IMAGE SCANNER AND COPIER SYSTEM WITH COLOR MATRIX IMAGE ENHANCEMENT

[75] Inventor: Lawrence E. Alston, Chelmsford, Mass.

[73] Assignee: Polaroid Corporation, Cambridge, Mass.

[21] Appl. No.: 681,788

[22] Filed: Dec. 14, 1984

[51] Int. Cl.⁴ .............................................. H04N 1/46
[52] U.S. Cl. ....................................... 358/75; 358/78; 358/80
[58] Field of Search ............................. 358/75, 78, 80

[56] References Cited

U.S. PATENT DOCUMENTS

| 3,644,664 | 2/1972 | Huboi et al. | 178/5.2 A |
|---|---|---|---|
| 4,319,268 | 3/1982 | Yamada | 358/75 |
| 4,438,453 | 3/1984 | Alston | 358/75 |
| 4,468,692 | 8/1984 | Yamada et al. | 358/80 |
| 4,573,071 | 2/1986 | Sakamoto | 358/80 |
| 4,577,218 | 3/1986 | Karata | 358/80 |
| 4,578,701 | 3/1986 | Nakaji | 358/75 |

FOREIGN PATENT DOCUMENTS

| 3417188 | 11/1984 | Fed. Rep. of Germany | 358/75 |
|---|---|---|---|
| 56-89187 | 7/1981 | Japan | 358/75 |
| 59-156065 | 9/1984 | Japan | 358/75 |

OTHER PUBLICATIONS

Optoelectronics Data Book, "Type TC102 128×1 CCD Linear Image Sensor", by Texas Instruments, Inc., pp. 2-17 through 2-27, Apr. 1982.

Primary Examiner—Henry G. Yuen
Attorney, Agent, or Firm—Edward S. Roman

[57] ABSTRACT

Image sensing and processing apparatus for use in an image facsimile system in which a subject is sensed in its primary red, green and blue colors as well as its complementary cyan, magenta and yellow colors to provide full color correction or enhancement as a function of color matrixing each primary color with its respective complementary color.

18 Claims, 3 Drawing Figures

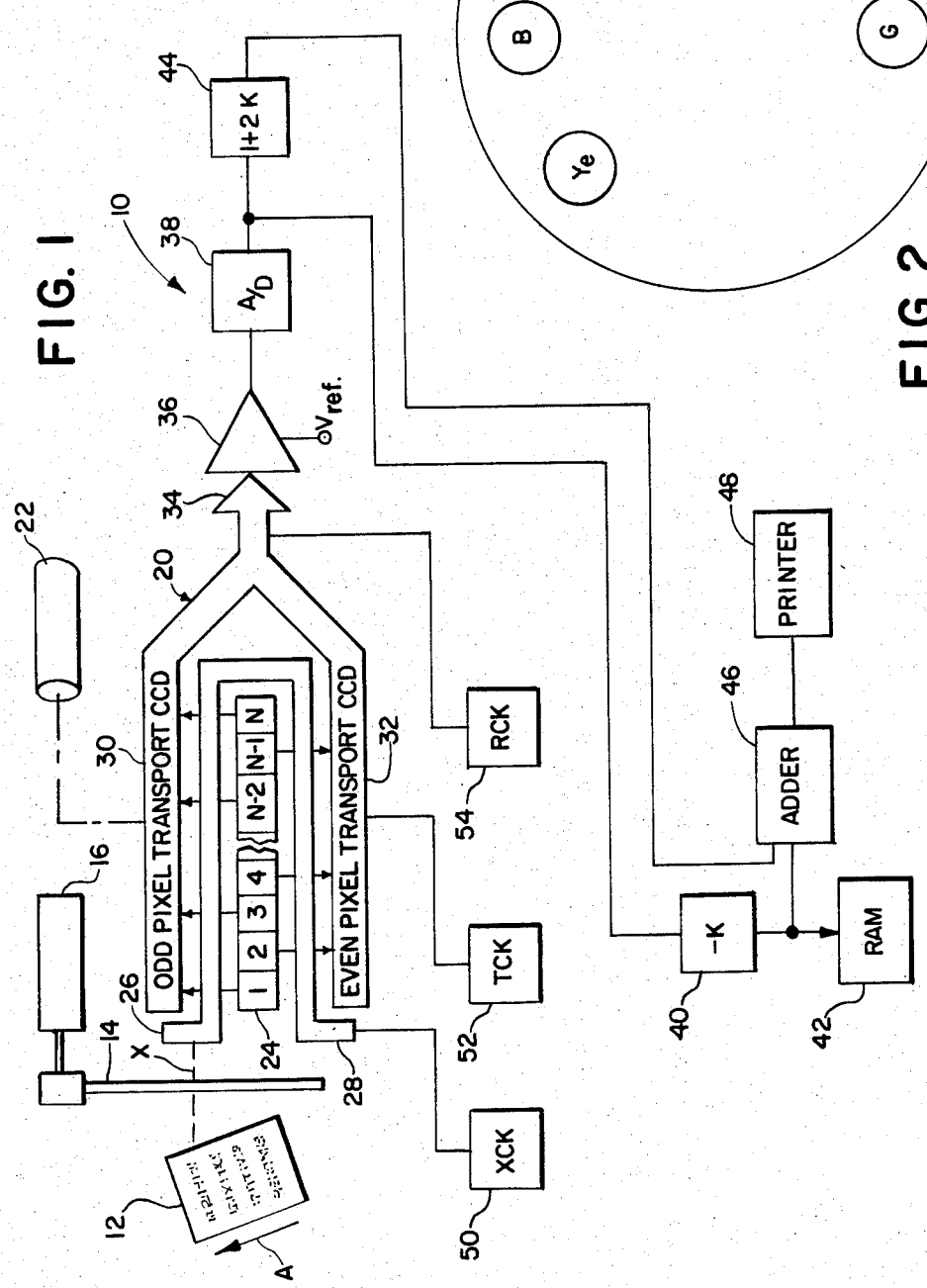

ELECTRONIC IMAGE SCANNER AND COPIER SYSTEM WITH COLOR MATRIX IMAGE ENHANCEMENT

BACKGROUND OF THE INVENTION

1. Field of the Invention

This invention relates generally to an image sensing and processing apparatus and, more particularly, to an electronic image sensing and processing apparatus for providing an enhanced electrical output signal.

2. Description of the Prior Art

Electronic image scanning and processing apparatus embodying a charge transfer type of scanning device such as a CCD fabricated in the form of an integrated circuit on a thin silicon semiconductor substrate are well known in the art.

It is also well known to utilize such apparatus to scan a subject such as a color negative or transparency or a positive or a document and process the information derived therefrom to provide a facsimile of the subject in enhanced or corrected colors. Such apparatus sense the subject and introduce a color correction factor so that each color has a predetermined density and displays the subject with a corrected color as disclosed in U.S. Pat. No. 3,644,664, entitled "Correction Level Adjustment for Video Negative Analyzer", by Robert Huboi et al., issued Feb. 22, 1972. Huboi et al. recognized that prior art color analyzing and correction devices were deficient in not taking into account the effect that one color may have on another color in determining the degree of color correction that should be imparted to the image. Toward that end well-known color correction equations are utilized in which each red, green and blue primary color is corrected as a function of all three primary colors. As is readily apparent, in order to provide such color correction it is necessary that the red, green and blue color signals be available at all times despite the fact that the subject is generally scanned through red, green and blue light filter elements with each filter element moved in sequence over the light sensing device. Huboi et al. manages to provide continuous red, green and blue color separation signals through complex circuitry that continuously determines each color separation signal as a function of the other color scanned during those intervals in which that color is not directly scanned. Continuous red, green and blue color separation signals can also be provided during the sequential red, green and blue color filter scan of the subject by storing in image memory those color signal components scanned through the immediately preceding color filter in the sequence. Such image memories, however, must have large storage capacities in order to accommodate the large volume of image data that must be stored for each of the two primary colors not being immediately scanned. This capacity requirement must be even further increased when the electronic image data is converted from an analog format to a digital format in order to provide a high quality facsimile of the subject.

Therefore, it is a primary object of this invention to provide an electronic image sensing and processing apparatus in which the red, green and blue color separation signals are each enhanced as a function of the other color separation signals utilizing a minimum storage capacity memory.

It is a further object of this invention to provide an electronic image sensing and processing apparatus in which the primary red, green and blue color separation signals are sensed with their complementary cyan, magenta and yellow color separation signals to provide full color correction or enhancement as a function of color matrixing each primary color with its respective complementary color.

Other objects of the invention will be in part obvious and will in part appear hereinafter. The invention accordingly comprises a mechanism and system possessing a construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a schematic block diagram for the image sensing and processing apparatus of this invention;

FIG. 2 is a front view of the filter wheel arrangement utilized in the image sensing and processing apparatus of FIG. 1.

SUMMARY OF THE INVENTION

Figure 3:
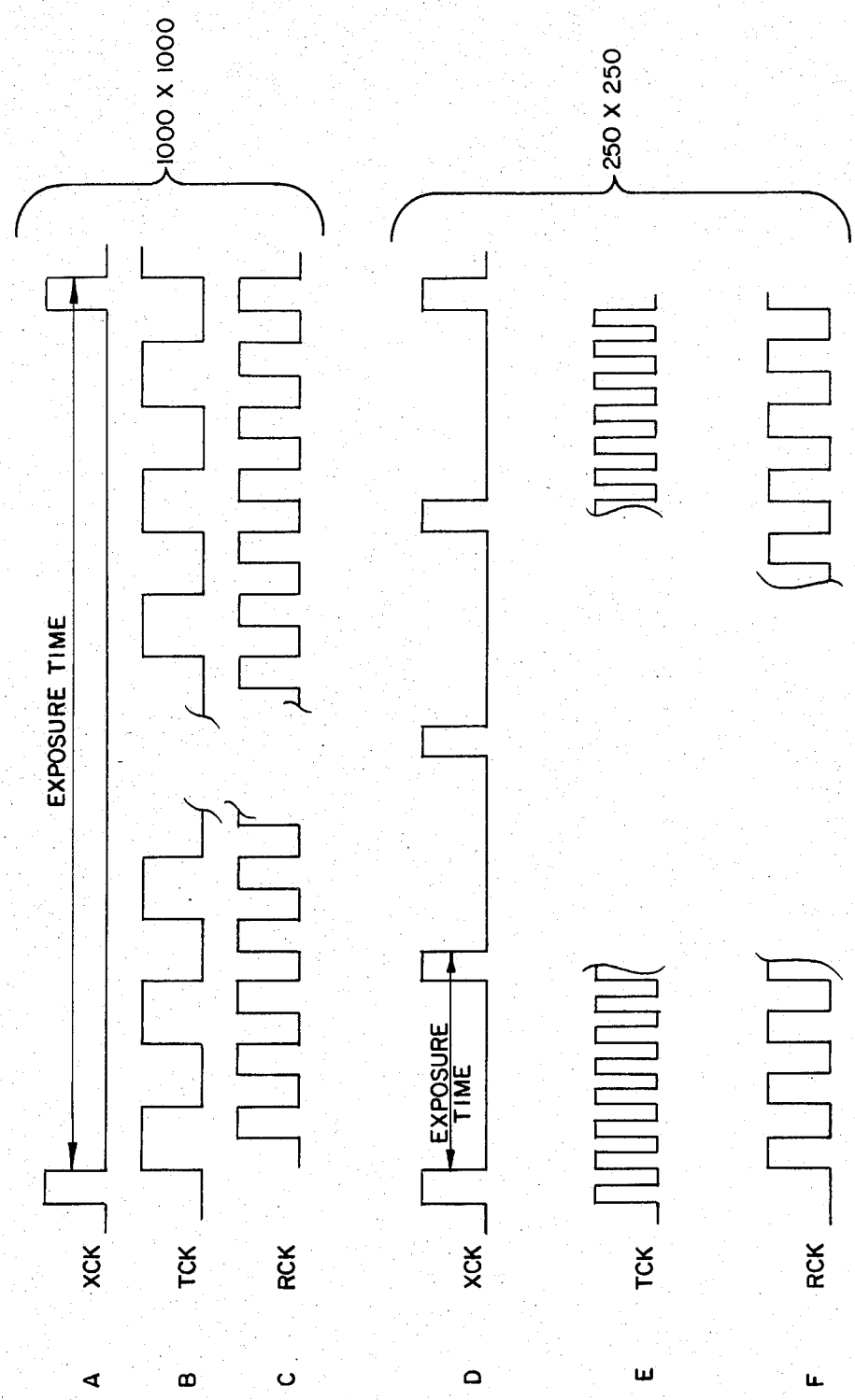
FIG. 3 is a graphical representation for various clock pulse trains provided by various clocks in the image sensing and processing apparatus of FIG. 1.

An image sensing and processing apparatus comprises a photosensitive means for sensing the light incident thereto from a subject and for providing an electrical output signal therefrom representative of the incident light so sensed. Means are provided for sequentially filtering the light sensed by the photoresponsive means in the primary red, green and blue colors and the complementary yellow, cyan and magenta colors so as to establish red, green, blue, yellow, cyan and magenta color components of the electrical output signal from the photoresponsive means. Signal processing means provide an enhanced electrical output signal having enhanced red, green and blue color components thereof. The enhanced red color component is determined as a function of the color matrixing of the red color component of the electrical output signal with the cyan color component of the electrical signal. In like manner, the enhanced green color component is determined as a function of the color matrixing of the green color component of the electrical output signal with the magenta color component of the electrical output signal. Finally, the blue color component is determined as a function of the color matrixing of the blue color component of the electrical output signal with the yellow component of the electrical output signal. Means may also be included which respond to the enhanced electrical output signal to provide an enhanced facsimile of the image so detected by the photoresponsive means.

DESCRIPTION OF THE PREFERRED EMBODIMENT

Referring now to FIG. 1, there is shown a schematic block diagram for an electronic image sensing and processing system which embodies the color matrix image enhancement feature of this invention. A document, photograph or slide transparency to be electronically sensed and processed is shown generally at 12 in position to be line scanned by a CCD linear image sensor as shown generally at 20. A filter wheel as shown generally at 14 comprising a plurality of circumferentially spaced apart individual light filtering elements is disposed between the subject 12 to be scanned and the linear image sensor 20 so as to filter the image defining light rays sensed by the linear image sensor 20.

The linear image sensor 20 comprises a line of light sensor or photoresponsive elements or pixels (1 through N) as shown generally at 24. The line of sensor elements 24 is comprised of single crystal silicon in which the image photons create electron hole pairs. The electrons are collected in the individual sensor elements (1 through N), and the holes are swept into the substrate. The amount of charge accumulated in each sensor element (1 through N) is a linear function of the incident light and the exposure time, and the output signal charge will vary in an analog manner from a thermally generated noise background at zero illumination to a maximum at saturation under bright illumination.

Adjacent one side of the line of image sensor elements 24 there is provided an odd pixel transfer gate 26, and adjacent the other side of the line of image sensor elements 24 there is provided an even pixel transfer gate 28. Adjacent the odd and even pixel transfer gates 26 and 28, there is provided respectively an odd pixel CCD transport shift register 30 and an even pixel CCD transport shift register 32. The transfer of charge from the individual sensor elements 24 to the transport shift registers 30, 32 by way of the transfer gates 26, 28 respectively is controlled by a transfer clock as shown at 50. The charge packets accumulated in the individual sensor elements 24 are transferred into storage wells of respective ones of the odd/even pixel transfer gates 26, 28 when the transfer gate clock voltage from the clock 50 goes high. When the transfer gate clock voltage from the clock 50 goes low, the charge packets are transferred from respective storage wells of the odd/even pixel transfer gates 26, 28 into corresponding ones of the odd/even transport shift registers 30 and 32. Thus, in this manner the odd/even pixel transfer gates 26 and 28 operate to control the exposure time for the sensor elements 24.

Alternate charge packets transferred to the odd/even CCD transport shift registers 30 and 32 are thereafter moved serially to a charge detection diode as shown generally at 34 by a transport clock pulse train provided from a transport clock 52. The charge packets are alternately transported by the transport clock pulse train from the transport clock 52 to the charge detection diode whose potential changes linearly in response to the amount of the signal charge delivered thereto. The potential at the charge detection diode 34 is applied to the input gate of a cascaded source follower MOS amplifier 36 which, in turn, operates to provide an electrical output signal. The charge detection diode 34 is reset before the arrival of each new signal charge packet from the CCD transport shift registers 30 and 32 by a reset clock pulse train provided by a reset clock 54. The phase relationship of the reset clock pulse train provided by the reset clock 54 and the transport clock pulse train provided by the transport clock 52 and the geometric layout of the paths provide for alternate delivery of charge packets to reestablish the original sequence of the linear image data.

The electrical output signal from the cascaded source follower MOS amplifier 36, in turn, is directed to an analog-to-digital converter 38 from which the analog signal is converted to a digital signal for each sensor element. The digitized image data, in turn, is directed to an arithmetic logic unit as shown generally at 40 for multiplication by a constant factor ($-K$). In its preferred form the arithmetic logic unit 40 may comprise a lookup table. After multiplication by the constant factor ($-K$), the digitized data from the arithmetic logic unit 40 is thereafter directed for storage in an image memory as shown generally at 42 which in its preferred mode may comprise a random access memory (RAM).

Digitized image data from the analog-to-digital converter 38 is also directed to another arithmetic logic unit 44 for multiplication by another constant factor ($1+2K$) Again, the arithmetic logic unit 44 in its preferred form comprises a lookup table. The digital output signal from the arithmetic logic unit 44, in turn, is directed to an adder circuit 46 for combination with the output from the RAM 42. The output signal from the adder 46, in turn, represents an enhanced electrical output signal which may thereafter be directed to a printer 48 from whence an enhanced image facsimile of the subject 12 originally scanned may be provided in the usual manner. The printer 48 may be any conventional well-known electronic facsimile recording device such as a thermal printer, a CRT printer, or a laser printer.

Referring now to FIG. 2, there is shown the preferred arrangement of this invention for the circumferentially spaced apart filter elements of the filter wheel 14. As is readily apparent from the drawing, the filter wheel 14 comprises the primary colored red, green and blue filter elements alternately disposed with respect to the complementary colored yellow, cyan and magenta filter elements.

Image enhancing color correction is provided in the manner of this invention using standard color matrixing in accordance with the following equations where K may typically be in the order of 0.3.

$$R''=(1+2K)B-KR-KG$$

$$R''=(1+2K)R-KB-KG$$

$$G''=(1+2K)G-KR-KB$$

B'', R'' and G'' represent the enhanced electrical color separation signals. These color matrixing equations can be rewritten in terms of the complementary colors yellow, cyan and magenta as follows.

$$B''=(1+2K)B-K \text{ Yellow}$$

$$R''=(1+2K)R-K \text{ Cyan}$$

$$G''=(1+2K)G-K \text{ Magenta}$$

Operation of the image sensing and processing system 10 may commence by rotatably driving the filter wheel 14 with a motor 16 into position such that the subject 12 can be line scanned by the linear image sensor 20 through the yellow filter. The line of sensor elements 24 may comprise approximately 1,000 individual sensing elements or pixels and may be moved transversely across the face of the item 12 by the motor 22 in the direction as shown by the arrow A. As previously discussed, electrons are collected in the individual sensor elements and the holes are swept into the substrate such that the amount of charge accumulated in each sensor element is a linear function of the incident light and the exposure time. For reasons that will become apparent from the following discussion, it is preferred that the complementary colors yellow, cyan and magenta be sensed in low resolution equivalent to a 250×250 pixel matrix scan. By contrast, the primary colors red, green and blue are sensed at full resolution equivalent to a 1,000×1,000 pixel matrix scan.

As previously discussed, the transfer clock 50 as shown in FIG. 3 controls the transfer of charge packets from the sensor elements 24 to the transport shift registers 30, 32 and thus the interval between the pulses of the transfer clock pulse train determines the exposure time for each sensing element. The transfer clock pulse train for a full resolution 1,000×1,000 pixel matrix scan is shown at A in FIG. 3 along with the accompanying transport and reset clock pulse trains as shown at B and C which control respectively the transport of charge packets from the shift registers 30 and 32 and the recharging of the charge detection diode 34 for each charge packet received from the transport shift registers 30 and 32. The full resolution 1,000 by 1,000 pixel matrix scan may be reduced to a low resolution 250×250 pixel matrix scan by changing the transfer clock pulse train and transport clock pulse train as shown at D and E in FIG. 3 while simultaneously increasing the speed of the motor 22 to drive the linear image sensor 20 across the item 12 in the direction of the arrow A at quadruple the speed at which the full resolution 1,000×1,000 pixel matrix scan is made.

As is readily apparent from FIG. 3, the frequency of the transfer clock pulse train D is also quadrupled so as to provide one-fourth the exposure time as that provided by the transfer clock pulse train A. With one-fourth the exposure time for each light sensing element there can thus only be accumulated one-fourth the charge packets for each light sensing element as would otherwise be accumulated for the transfer clock pulse train A. Thus, each light sensing element accumulates one-fourth the charge packets as would otherwise be accumulated during the full resolution scan. The transport clock pulse train frequency in E for the low resolution 250×250 pixel matrix scan, in turn, is also quadrupled in comparison to the frequency of the transport clock pulse train B for the full resolution 1,000×1,000 pixel matrix scan. Thus, the charge detection diode 34 receives charge packets at four times the rate for the low resolution scan as for the high resolution scan so as to allow the charge packets from four sensing elements to accumulate prior to each reset. Since as previously discussed each sensing element accumulates only one-fourth the charge packets it would otherwise accumulate during the full resolution scan, resetting the charge detection diode 34 after receiving the charge packets from four sensing elements operates to provide an analog output value equivalent to the average value of four linear picture sensing elements. Thus, in this manner can low resolution average values be provided for a predetermined number of linear sensing elements. Vertical averaging is provided simply by increasing the vertical scan rate by scanning over four horizontal lines in the same time as a single horizontal line scan would otherwise be made. Thus, in this manner can a low resolution 250×250 pixel matrix scan be made.

The subject 12 is thus fully line scanned through the yellow filter to provide a low resolution analog electrical output signal from the cascaded source follower MOS amplifier 36 to the analog-to-digital converter 38. The analog electrical output signal, in turn, is converted to a digitized signal and thereafter directed to the arithmetic logic unit 40 in which the digitized data is multiplied by the factor ($-K$). The modified output signal from the arithmetic logic unit 40 is thereafter directed to the (RAM) 42 for temporary storage.

The filter wheel 14 is thereafter incrementally rotated so as to bring the blue filter into position between the subject 12 and linear image sensor 20 for the next line scan operation. As previously discussed, the line scan through the blue filter element is conducted at full resolution to provide the 1,000×1,000 pixel matrix scan utilizing the transfer clock pulse train A and the transport clock pulse train B of FIG. 3. As previously discussed, the motor 22 is operated at one-fourth the speed previously utilized during the line scan through the yellow filter element to provide the full resolution output. The electrical output signal from the cascaded source follower MOS amplifier 36, in turn, is directed to the analog-to-digital converter 38 for conversion to a digital signal which, in turn, is directed to the arithmetic logic unit 44 for multiplication by the factor ($1+2K$). The output signal for each pixel from the arithmetic logic unit 44, in turn, is added to the output signal for the corresponding low resolution pixel retrieved from the (RAM) 42 representative of the previous line scan through the yellow filter. Thus, the adder 46 provides an enhanced output blue color signal in accordance with the first modified color matrix equation. The enhanced blue color signal may be thereafter directed to the printer 48 to print the blue primary color in the usual manner.

The filter wheel 14 is next incrementally rotated by the motor 16 to move the cyan filter into position between the subject 12 and image sensor 20 in order to enable the next line scan to be made through the cyan filter element. As previously discussed, the line scan through the cyan filter element is made at the low resolution 250×250 pixel matrix scan utilizing the transfer clock pulse train D and transport clock pulse train E of FIG. 3. The low resolution video signal is converted from an analog-to-digital value in the aforementioned manner by the analog-to-digital converter 38 and thereafter directed to the arithmetic logic unit 40 for multiplication by the factor ($-K$). The low resolution cyan video signal is thereafter stored in the (RAM) 42.

The filter wheel is thereafter incrementally rotated by the motor 16 so as to move the red filter element into position between the subject 12 and the image sensor 20 so as to enable the next line scan to be made through the red filter element. As previously discussed, the line scan of the subject 12 through the red filter element is made at the full resolution 1,000×1,000 pixel matrix scan using the transfer clock pulse train A and transport clock pulse train B of FIG. 3. The high resolution output video signal from the cascaded source follower MOS amplifier 36 is converted by the analog-to-digital converter 38 to a digital value and thereafter multiplied by the factor ($1+2K$) by the arithmetic logic unit 44. The multiplied output signal for each pixel from the arithmetic logic unit 44, in turn, is added to the cyan signal for each corresponding low resolution pixel previously stored in the (RAM) 42. The output from the adder 46 thus provides an enhanced red color signal in accordance with the second modified color matrix equation. The enhanced red color signal is thereafter utilized in the usual manner by the printer 48 to print the red color component of the hard copy.

The filter wheel 14 is thereafter incrementally rotated by the motor 16 to drive the magenta filter element into position between the subject 12 and the image sensor 20. The image sensor 20 thereafter completes another line scan of the subject 12 at the aforementioned low resolution 250×250 pixel matrix scan utilizing the transfer clock pulse train D and the transport clock pulse train E of FIG. 3. The low resolution video output signal from the cascaded source follower MOS amplifier 36 is thereafter converted to a digital signal by the analog-to-digital converter 38. The digitized signal, in turn, is directed for multiplication by the factor (−K) by the arithmetic logic unit 40 from whence it is transferred for storage in the (RAM) 42.

The filter wheel is thereafter incrementally driven by the motor 16 to move the green filter element into position between the subject 12 to be line scanned and the linear image sensor 20. The image sensor 20 thus line scans the item 12 through the green filter element to provide a high resolution 1,000×1,000 pixel matrix scan utilizing the transfer clock pulse train A and the transport clock pulse train B of FIG. 3. The high resolution video signal, in turn, is converted by the A/D converter 38 to a digital signal and thereafter multiplied by the factor (1+2K) by the arithmetic logic unit 44. The digital output signal for each pixel modified by the factor (1+2K) is thereafter added to the previously sensed magenta digital signal for each corresponding low resolution pixel from the (RAM) 42 to provide an enhanced green output signal in the manner of the third line of the modified color matrix equations. The enhanced green color signal is thereafter directed to the printer 48 for printing in the usual manner of the green colored component of the hard copy.

In this manner, color matrixing can be accomplished in a simple and economical manner utilizing a minimum capacity memory, i.e., (RAM) 42, having sufficient memory to hold digital image data for only a 250×250 pixel array. This minimum capacity memory may be utilized to achieve color matrixing as a direct result of the independent sensing of the primary red, green and blue color components as well as the yellow, cyan and magenta complementary color components of the image. Thus, the arrangement of filter elements to sense both the primary red, green and blue color components as well as the complementary colored yellow, cyan and magenta components enables color matrixing image enhancement to be accomplished while storing only one of the complementary color components at a time. In addition, sensing the complementary color components in low resolution in comparison to the high resolution in which the primary red, green and blue color components are sensed operates to further reduce the memory capacity storage requirements for the random access memory (RAM) 42.

Other embodiments of the invention, including additions, subtractions, deletions and other modifications of the preferred disclosed embodiments of the invention will be obvious to those skilled in the art and are within the scope of the following claims.

What is claimed is:

1. A method for electronically sensing an image and processing the electronic signal information so sensed comprising the step of:
sequentially filtering an image defining light in the primary red, green and blue colors and the complementary yellow, cyan and magenta colors;
sensing said filtered image defining light to provide an electrical output signal having red, green, blue, yellow, cyan and magenta color components thereof; and
processing said electrical output signal to provide an enhanced electrical output signal having enhanced red, green, and blue color components thereof wherein: said enhanced red color component is provided as a function of the color matrixing of said red color component of said electrical output signal with said cyan color component of said electrical output signal, said enhanced green color component is provided as a function of the color matrixing of said green color component of said electrical output signal with said magenta color component of said electrical output signal and said enhanced blue color component is provided as a function of the color matrixing of said blue color component of said electrical output signal with said yellow component of said electrical output signal.

2. The method of claim 1 wherein: the cyan color component of said electrical output signal is sensed and stored in memory, the red color component of said electrical output signal is thereafter sensed, and the cyan color component is retrieved from memory and color matrixed with said sensed red color component; the magenta color component of said electrical output signal is sensed and stored in memory, the green color component of said electrical output signal is thereafter sensed, and the magenta color component is retrieved from memory and color matrixed with said sensed green color component; and the yellow color component of said electrical output signal is sensed and stored in memory, the blue color component of said electrical output signal is thereafter sensed, and the yellow component is retrieved from memory and color matrixed with said sensed blue color component.

3. Image sensing and processing apparatus comprising:
photoresponsive means for sensing the light incident thereto from a subject and providing an electrical output signal therefrom representative of the incident light so sensed;
means for sequentially filtering the light sensed by said photoresponsive means in the primary red, green and blue colors and the complementary yellow, cyan and magenta colors so as to establish red, green, blue, yellow, cyan and magenta color components of said electrical ouptut signal; and
signal processing means for providing an enhanced electrical output signal having enhanced red, green and blue color components thereof, said enhanced red color component being determined as a function of the color matrixing of said red color component of said electrical output signal with said cyan color component of said electrical output signal, said enhanced green color component being determined as a function of the color matrixing of said green color component of said electrical output signal with said magenta color component of said electrical output signal, and said enhanced blue color component being determined as a function of the color matrixing of said blue color component of said electrical output signal with said yellow component of said electrical output signal wherein means for storing said electrical output signal in memory are included and said photoresponsive and filtering means operate to provide the cyan color component of said electrical output signal for storage in said memory immediately prior to providing the red color component of said electrical output signal so as to enable said red color component to be color matrixed with said cyan color component retrieved from said memory; the magenta color component of said electrical output signal for storage in said memory immediately prior to providing the green color component of said electrical output signal so as to enable said green color component to be color matrixed with said magenta color component retrieved from said memory; and the yellow color component of said electrical output signal for storage in said memory immediately prior to providing the blue color component of said electrical output signal so as to enable said blue color component to be color matrixed with said yellow color component retrieved from said memory; said memory thus being required to store only one of said complentary cyan, magenta, or yellow color components at a time, and wherein said signal processing means comprises a first arithmetic logic unit for multiplying respectively the complementary cyan, magenta and yellow color components of said electrical output signal by a factor of $(-K)$ prior to storage in said memory, a second arithmetic logic unit for multiplying respectively the primary red, green and blue color components of said electrical output signal by a factor $(1+2K)$, and means for adding said red and cyan color components of said electrical output signal subsequent to said multiplication, adding said green and magneta color components of said electrical output signal subsequent to said multiplication, and adding said blue and yellow color components of said electrical output signal subsequent to said multiplication.

4. The apparatus of claim 3 wherein said photoresponsive means comprises a linear array of light sensing elements for providing a line scan of the subject and means for establishing relative movement between said linear array and the subject in a direction transverse to the direction of said line scan in order to enable said linear array to scan the entire area of the subject.

5. The apparatus of claim 4 wherein said light filtering means comprises a filter wheel disposed for rotation about a fixed axis relative to said linear array, said filter wheel comprising a plurality of primary colored red, green and blue filter elements circumferentially disposed about said wheel in interspaced relationship with a plurality of complementary colored cyan, magenta and yellow filter elements also circumferentially disposed about said wheel.

6. The apparatus of claim 3 wherein said signal processing means comprises an analog-to-digital converter for converting said primary and complementary colored components of said electrical output signal to digitized values prior to said color matrixing.

7. Image sensing and processing apparatus comprising:
   photoresponsive means for sensing the light incident thereto from a subject and providing an electrical output signal therefrom representative of the incident light so sensed;
   means for sequentially filtering the light sensed by said photoresponsive means in the primary red, green and blue colors and the complementary yellow, cyan and magenta colors so as to establish red, green, blue, yellow, cyan and magenta color components of said electrical output signal; and
   signal processing means for providing an enhanced electrical output signal having enhanced red, green and blue color components thereof, said enhanced red color component being determined as a function of the color matrixing of said red color component of said electrical output signal with said cyan color component of said electrical output signal, said enhanced green color component being determined as a function of the color matrixing of said green color component of said electrical output signal with said magenta color component of said electrical output signal, and said enhanced blue color component being determined as a function of the color matrixing of said blue color component of said electrical output signal with said yellow component of said electrical output signal.

8. The apparatus of claim 7 wherein means for storing said electrical output signal in memory are included and said photoresponsive and filtering means operate to provide the cyan color component of said electrical output signal for storage in said memroy immediately prior to providing the red color component of said electrical output signal so as to enable said red color component to be color matrixed with said cyan color component retrieved from said memory; the magenta color component of said electrical output signal for storage in said memory immediately prior to providing the green color component of said electrical output signal so as to enable said green color component to be color matrixed with said magenta color component retireved from said memory; and the yellow color component of said electrical output signal for storage in said memory immediately prior to providing the blue color component of said electrical output signal so as to enable said blue color component to be color matrixed with said yellow color component retrieved from said memory; said memory thus being required to store only one of said complementary cyan, magenta, or yellow color components at a time.

9. The appartus of claim 7 further including means responsive to the enhanced electrical output signal for providdng an enhanced facsimile of the image so detected by said photoresponsive means.

10. In an electronic image facsimile system of the type which provides color matrix enhancement and comprises photoresponsive means for sensing the light incident thereto from a subject and providing an electrical output signal therefrom representative of the incident light so sensed and means responsive to an enhanced electrical output signal for providing a facsimile of the subject so sensed, the improvement comprising:
   means for sequentially filtering the light sensed by said photoresponsive means in the primary red, green and blue colors and the complementary yellow, cyan and magenta colors so as to establish red, green, blue, yellow, cyan and magenta color components of said electrical output signal; and
   signal processing means for providing an enhanced electrical output signal having enhanced red, green and blue color components thereof, said enhanced red color component being determined as a function of the color matrixing of said red color component of said electrical output signal with said cyan color component of said electrical output signal, said enhanced green color component being determined as a function of the color matrixing of said green color component of said electrical output signal with said magenta color component of said electrical output signal, and said enhanced blue color component being determined as a function of the color matrixing of said blue color component of said electrical output signal with said yellow component of said electrical output signal wherein said signal processing means includes means for sorting said electrical output signal in memory and said filtering means operates in conjunction with the photoresponsive means to provide: the cyan color component of said electrical output signal for storage in said memory immediately prior to providng the red color component of said electrical output signal so as to enable said signal processing means to color matrix said red color component with said cyan color component retrieved from said memory; the magenta color component of said electrical output signal for storage in said memory immediately prior to providing the green color component of said electrical output signal so as to enable said signal processing means to color matrix said green color component with said magenta color component retrieved from said memory; and the yellow color component of said electrical output signal for storage in said memory immediately prior to providing the blue color component of said electrical output signal so as to enable said signal processing means to color matrix said blue color component with said yellow color component retrieved from said memory; said memory thus being required to store only one of said complementary cyan, magenta, or yellow color components at a time, and wherein said signal processing means comprises a first arithmetic logic unit for multiplying respectively the complmentary cyan, magenta and yellow color components of said electrical output signal by a factor of $(-K)$ prior to storage in said memory, a second arithmetic logic unit for multiplying respectively the primary red, green and blue color components of said electrical output signal by a factor $(1+2K)$, and means for adding said red and cyan color components of said electrical output signal subsequent to said multiplication, adding said green and magenta color components of said electrical output signal subsequent to said multiplication, and adding said blue and yellow color components of said electrical output signal subsequent to said multiplication.

11. The improvement of claim 10 wherein said light filtering means comprising a filter wheel disposed for rotation about a fixed axis relative to the linear array, said filter wheel comprising a plurality of primary colored red, green and blue filter elements circumferentially disposed about said wheel in interspaced relationship with a plurality of complementary colored cyan, magenta and yellow filter elements also circumferentially disposed about said wheel.

12. The improvement of claim 10 wherein said signal processing means comprises an analog-to-digital converter for converting said primary and complementary colored components of said electrical output signal to digitized values prior to said color matrixing.

13. In an electronic image facsimile system of the type which provides color matrix enhancement and comprises photoresponsive means for sensing the light incident thereto from a subject and providing an electrical output signal therefrom representative of the incident light so sensed and means responsive to an enhanced electrical output signal for providing a facsimile of the subject so sensed, the improvement comprising:

means for sequentially filtering the light sensed by said photoresponsive means in the primary red, green and blue colors and the complementary yellow, cyan and magenta colors so as to establish red, green, blue, yellow, cyan and magenta color components of said electrical output signal; and signal processing means for providing an enhanced electrical output signal having enhanced red, green and blue color components thereof, said enhanced red color component being determined as a function of the color matrixing of said red color component of said electrical output signal with said cyan color component of said electrical output signal, said enhanced green color component being determined as a function of the color matrixing of said green color component of said electrical output signal with said magenta color component of said electrical output signal, and said enhanced blue color component being determined as a function of the color matrixing of said blue color component of said electrical output signal with said yellow component of said electrical output signal.

14. The improvement of claim 13 wherein said signal processing means includes means for storing said electrical output signal in memory and said filtering means operates in conjunction with the photoresponsive means to provide: the cyan color component of said electrical output signal for storage in said memory immediately prior to providing the red color component of said electrical output signal so as to enable said signal processing means to color matrix said red color component with said cyan color component retrieved from said memory; the magenta color component of said electrical output signal for storage in said memory immediately prior to providing the green color component of said electrical output signal so as to enable said signal processing means to color matrix said green color component with said magenta color component retrieved from said memory; and the yellow color component of said electrical output signal for storage in said memory immediately prior to providing the blue color component of said electrical output signal so as to enable said signal processing means to color matrix said blue color component with said yellow color component retrieved from said memory; said memory thus being required to store only one of said complementary cyan, magenta, or yellow color components at a time.

15. A method for electronically sensing an image and processing the electronic signal information so sensed comprising the steps of:

sequentially filtering an image defining light in the primary red, green and blue colors and the complementary yellow, cyan and magenta colors;

sensing said filtered image defining light to provide an electrical output signal having red, green, blue, yellow, cyan and magenta color components thereof; and processing siad electrical output signal to provide an enhanced electrical output signal having enhanced red, green, and blue color components thereof wherein: said enhanced red color component is provided as a function of the color matrixing of said red color component of said electrical output signal with said cyan color component of said electrical output signal, said enhanced green color component is provided as a function of the color matrixing of said green color component of said electrical output signal with said magenta color component of said electrical output signal and said enhanced blue color component is provided as a function of the color matrixing of said blue color component of said electrical output signal with said yellow component of said electrical output signal wherein: the cyan color component of said electrical output signal is sensed and stored in memory, the red color component of said electrical output signal is thereafter sensed, and the cyan color component is retrieved from memory and color matrixed with said sensed red color component; the magenta color component of said electrical output signal is sensed and stored in memory, the green color component of said electrical output signal is thereafter sensed, and the magenta color component is retrieved from memory and color matrixed with said sensed green color component; and the yellow color component of said electrical output signal is sensed and stored in memory, the blue color component of said electrical output signal is thereafter sensed, and the yellow component is retrieved from memory and color matrixed with said sensed blue color component; said method further comprising the steps of:

multiplying respectively the complementary cyan, magenta and yellow components of said electrical output signal by a factor of $(-K)$ prior to storing in memory multiplying respectively the primary red, green and blue color components of said electrical output signal by a factor $(1+2K)$; and adding said red and cyan color components of said electrical output signal to provide said enhanced red color component, adding said green and magenta color components of said electrical output signal to provide said enhanced green color component, and adding said blue and yellow color components of said electrical output signal to provide said enhanced blue color component.

16. The method of claim 15 wherein the image defining light is sensed by line scanning a subject with a linear array of light sensing elements.

17. The method of claim 16 wherein said sequential light filtering is provided by incrementally rotating a filter wheel comprising a plurality of primary colored red, green and blue filter elements circumferentially disposed about said wheel in interspaced relationship with a plurality of complementary colored cyan, magenta and yellow filter elements also circumferentially disposed about said wheel.

18. The method of claim 15 further comprising the step of digitizing said electrical output signal prior to said matrixing step.

* * * * *